Feb. 25, 1930.　　　W. W. TURSKE　　　1,748,372
MOTOR MOUNTING
Filed March 12, 1929　　2 Sheets-Sheet 1

Feb. 25, 1930.  W. W. TURSKE  1,748,372
MOTOR MOUNTING
Filed March 12, 1929.  2 Sheets-Sheet 2

Walter William Turske INVENTOR

BY Justin W. Macklin ATTORNEY

Patented Feb. 25, 1930

1,748,372

UNITED STATES PATENT OFFICE

WALTER WILLIAM TURSKE, OF CLEVELAND, OHIO

MOTOR MOUNTING

Application filed March 12, 1929. Serial No. 346,444.

My invention relates to aircraft and more particularly to heavier than air flying craft of the airplane type.

One of the objects of my invention is to enable aircraft of the above named character to take off and land quickly without the necessity of a long run along the ground, and to control the craft in flight whereby the craft may successfully and safely be brought out of a nose dive or tail spin.

Another object of my invention is to mount the driving motor so that the same may be tilted together with the propeller shaft as a unit at an angle to the fuselage of the craft.

Further objects and advantages of my invention will become more apparent as the following description of several embodiments thereof progresses, reference being made to the accompanying drawings in which like reference characters are employed to designate like parts throughout the same.

In the drawings—

Fig. 4 is an elevation of a second embodiment of my invention illustrating a modification of the motor tilting means shown in Figs. 1 to 3 inclusive.

In carrying out my invention I have provided a motor mounting for aircraft which will permit the motor and propeller of the craft to be tilted as a unit about an axis transverse to the longitudinal axis of the fuselage. In this manner the slip stream from the propeller may be disposed at a desired angle to the longitudinal axis of the fuselage during flight or in the take off or landing according to the will of the operator, to successfully pull out of a nose dive or tail spin or to rise or land quickly as the case may be.

Figure 1:
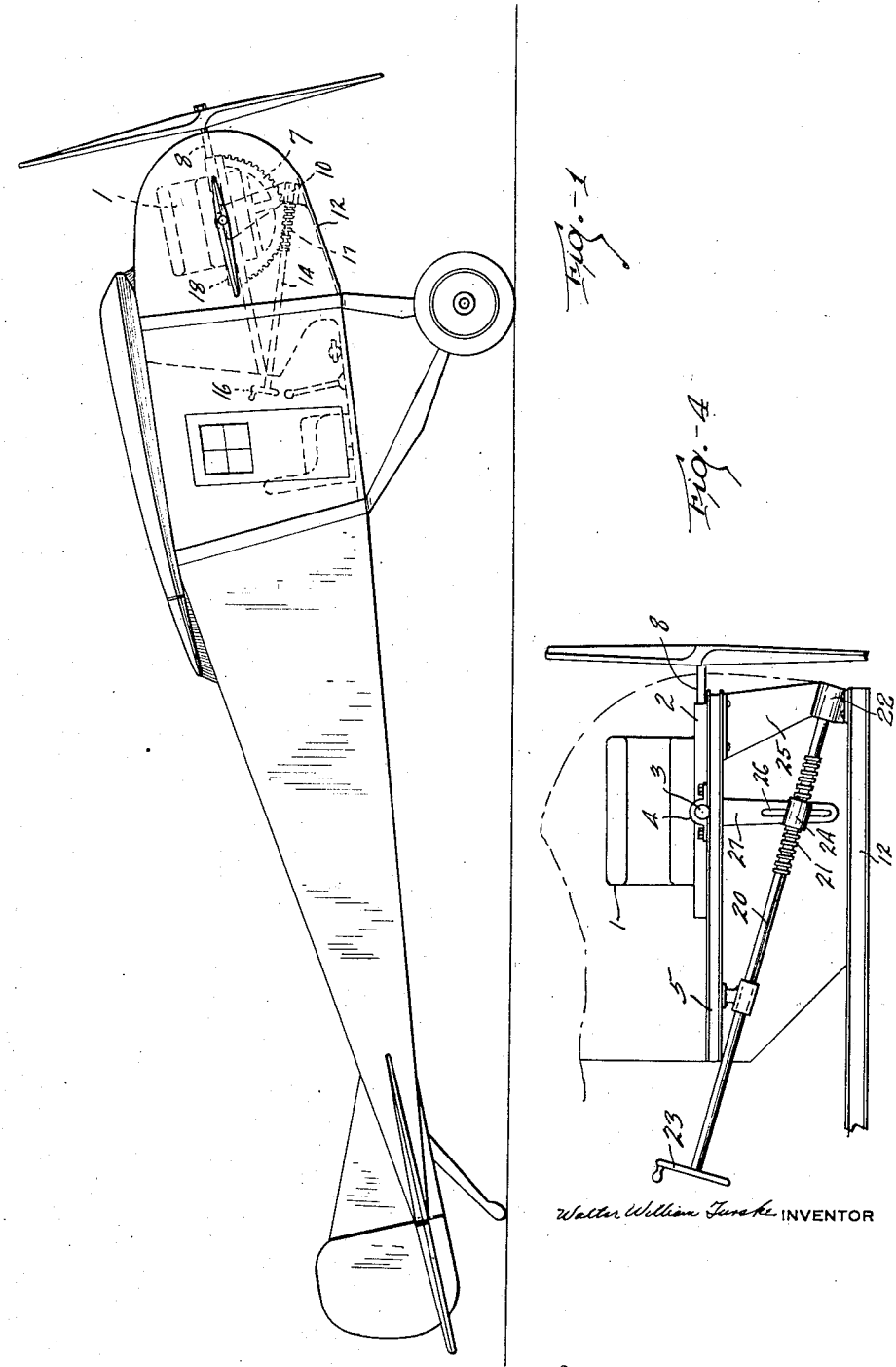
Fig. 1 is an elevation of a craft illustrating one form of my invention in use.
Figure 2:
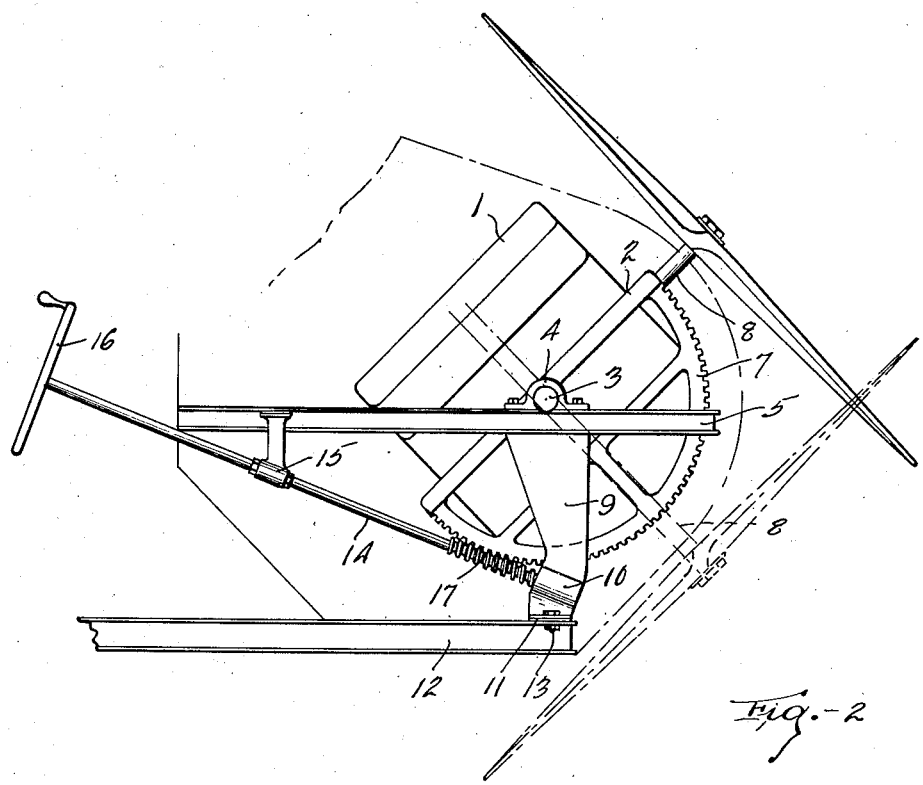
Fig. 2 is a side elevation of this form of my invention showing the motor and propeller tilted to one of its extreme positions in full lines, and tilted to its other extreme position in dotted lines.
Figure 3:
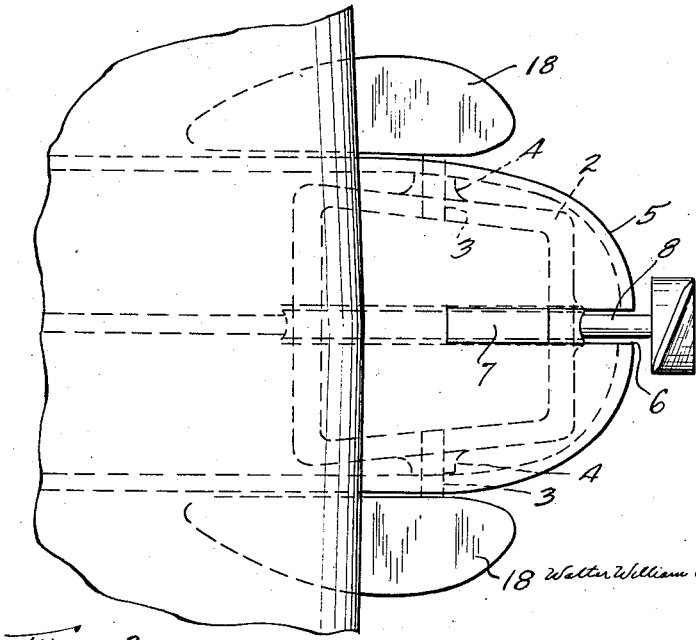
Fig. 3 is a plan view of the forward part of the fuselage in which the motor is mounted and illustrates the small aerofoils fixed in the propeller displacement flow, regardless of the position of the motor in its mounting.

Referring now more particularly to Figs. 1 to 3 in which I have illustrated one embodiment of my invention, the motor 1 is supported in a substantially rectangular frame 2. Supporting shafts 3 extend outwardly of the frame 2 and are rotatably supported in the bearings 4 on the respective channel beams 5 forming a part of the forward fuselage structure. The forward ends of the beams are spaced apart at 6 to permit movement of the propeller shaft in a vertical plane when the motor is tilted in its support.

A worm gear segment 7 is carried by the frame 2 and is disposed under the same in the plane of the axis of the propeller shaft 8. Braces 9 secured at their upper ends to the beams 5 converge downwardly and terminate in a bearing 10 and a plate 11. The plate is securely fixed to the lower beam 12 of the fuselage by means of bolts or rivets 13.

I have provided means for tilting the motor and propeller about its lateral axis which includes a shaft 14 rotatably supported at its lower end in the bearing 10 and intermediate its ends in the bearing bracket 15. A hand wheel 16 is keyed to the upper end of the shaft for turning the same. The shaft 14 extends upwardly at a convenient angle to the axis of the fuselage in the same vertical plane defining the position of the worm segment, and carries a worm gear 17 near its lower end which meshes with the teeth of the worm segment. Thus it will be seen that by rotating the hand wheel in one direction the motor may be tilted to one of the positions indicated in Fig. 2 and by rotating the wheel in the other direction the motor may be tilted in the other direction. It will be noted that the motor tilting means is extremely simple and eliminates the use of cables or levers which often break under the great stresses encountered when applied to uses of this kind.

By my invention I have provided a rigid support for the tiltable motor comprising essentially a triangular support in which the converging braces 9 form two legs of the triangle, while the axis of the shafts 3 forms the other leg, the worm segment 7 being movable between the braces 9.

I have provided small aerofoils 18 on each side of the forward end of the fuselage, which are movable with the motor throughout its entire range of movement, and are fixed in the slip stream of the propeller in any of its adjustments.

In Fig. 4 I have illustrated another embodiment of my invention. This embodiment is similar to that shown in Figs. 1 to 3 inclusive but differs therefrom in the motor tilting means.

In this embodiment a shaft 20 is screw threaded at 21 for a portion of its length, one end of the shaft being rotatably mounted in the bearing 22, while the other end of the shaft is provided with a hand wheel 23 for turning the same. A travelling internally threaded nut 24 is movable along the shaft when the same is turned. A pin 25 extends outwardly of the nut and into the elongated slot 26 formed in the depending arm 27. The arm 27 is secured to the frame 2 which supports the motor and as the nut 24 travels along the shaft 20, the arm 27 and frame 2 will be tilted in one direction, the pin 25 sliding along the slot 26 as the arm is tilted.

It will be seen that by my invention I have provided a tiltable motor support and means for tilting the same in a plane substantially vertical to the longitudinal axis of the fuselage whereby the propeller slip stream may be easily shifted at an angle to the axis of the fuselage. By such means the operator of a plane embodying my invention may easily regain control of the plane when the same has gone into a nose dive or tail spin during flight, by simply rotating the hand wheel and shaft to tilt the motor and propeller upwardly or downwardly to the desired angle. When the motor and propeller are tilted upwardly the slip stream will be disposed downwardly at an angle to the axis of the ship tending to lower the tail of the ship and to pull the nose upwardly. When the motor and propeller are tilted downwardly by rotating the handwheel in the opposite direction the slip stream will be disposed upwardly at an angle to the ship, pulling the tail up and pulling the nose of the ship down.

Thus it will be seen that the ship equipped with my invention can be effectively maneuvered to bring it out of what have heretofore been considered very dangerous positions in flight.

When it is desired to make a quick take off, that is, with an extremely short ground run, the operator rotates the wheel to tilt the motor and propeller upwardly at the desired angle whereupon the nose will be pulled upwardly for the take off. The axis of the motor and the fuselage may again be brought into substantial alignment for ordinary flying. To make a quick landing the operator tilts the motor and propeller downwardly at the desired angle whereupon the nose will be pulled down.

Various changes in the details of construction and arrangement of parts may be made without departing from the spirit of the invention or the scope of the subjoined claims.

I claim:

1. The combination with a fuselage of a motor, a motor support including forwardly extending fuselage beams, a motor supporting frame tiltably mounted on said beams, downwardly converging braces connecting the beams with the fuselage floor and terminating in a bearing, a drive shaft having one end rotatably mounted in the bearing, a worm on said shaft, a segmental worm gear suspended from the motor frame and tiltable therewith, and means for rotating the shaft.

2. The combination with a fuselage of a motor, a motor support including forwardly extending fuselage beams, a motor supporting frame tiltably mounted on said beams, bracing members connected at one of their respective ends to the said beams, their other ends converging and terminating at the base of the fuselage in a bearing, a driving shaft having one end rotatably mounted in the bearing, means for driving the shaft, and transmission means between the shaft and the frame to tilt the frame when the shaft is rotated.

3. The combination with a fuselage of a motor, a motor support including forwardly extending fuselage beams, a motor supporting frame tiltably mounted on said beams, downwardly converging braces connecting the beams with the fuselage floor and terminating in a bearing, a drive shaft having one end rotatably mounted in the bearing, a worm on said shaft, a segmental worm gear suspended from the motor frame and tiltable therewith, means for rotating the shaft, and aerofoils tiltable with the frame whereby the said aerofoils will be disposed in the plane of the propeller displacement flow regardless of the inclination of the motor with respect to the axis of the fuselage.

4. The combination with a fuselage of a motor, a motor support including forwardly extending fuselage beams, a motor supporting frame tiltably mounted on said beams, bracing members connected at one of their respective ends to the said beams, their other ends converging and terminating at the base of the fuselage in a bearing, a driving shaft having one end rotatably mounted in the bearing, means for driving the shaft, and transmission means between the shaft and the frame to tilt the frame when the shaft is rotated, said bracing members forming with an element of the plane of the fuselage through their respective intersections therewith a triangular support.

In testimony whereof, I hereunto affix my signature.

WALTER WILLIAM TURSKE.